United States Patent [19]
Yokoyama et al.

[11] Patent Number: 5,515,205
[45] Date of Patent: May 7, 1996

[54] LENS BARREL

[75] Inventors: Kunio Yokoyama, Tokyo; Shigeo Hayashi, Okaya, both of Japan

[73] Assignee: Olympus Optical Co., Ltd., Tokyo, Japan

[21] Appl. No.: 186,775

[22] Filed: Jan. 26, 1994

[30] Foreign Application Priority Data

Feb. 17, 1993 [JP] Japan .................................. 5-027884
Nov. 24, 1993 [JP] Japan .................................. 5-293246

[51] Int. Cl.$^6$ .................................................. G02B 15/14
[52] U.S. Cl. ............................................ 359/699; 359/826
[58] Field of Search .............................. 359/699, 700, 359/701, 702, 703, 704, 825, 826; 354/286, 288

[56] References Cited

U.S. PATENT DOCUMENTS

| | | | |
|---|---|---|---|
| 4,950,060 | 8/1990 | Nagasaka | 359/701 |
| 5,255,124 | 10/1993 | Iwamura | 359/699 |
| 5,268,794 | 12/1993 | Chan | 359/699 |
| 5,376,983 | 12/1994 | Yamazaki | 359/825 |

FOREIGN PATENT DOCUMENTS 1-59210  4/1989  Japan .

*Primary Examiner*—Georgia Y. Epps
*Assistant Examiner*—Ricky Mack
*Attorney, Agent, or Firm*—Frishauf, Holtz, Goodman, Langer & Chick

[57] ABSTRACT

A lens barrel comprises a number of main body ribs formed integral with a camera main body and projecting therefrom in the direction of the optical axis, first and second lens barrels provided between and movable along a pair of the main body ribs, and a cam ring mounted on the periphery of the main body ribs, the first and the second lens barrels and rotatable with respect to the camera main body around the optical axis. The cam ring has a first cam groove having an opening portion and a second cam groove having a recess. First and second cam followers of the first and second lens barrels are engaged with the first and second cam grooves, respectively. When the cam ring is rotated in a direction A or B, the first and second cam followers are moved forward or backward along the first and second cam grooves. As a result, the first and second lens barrels are moved forward or backward in the direction of the optical axis along the pair of the main body ribs.

27 Claims, 4 Drawing Sheets

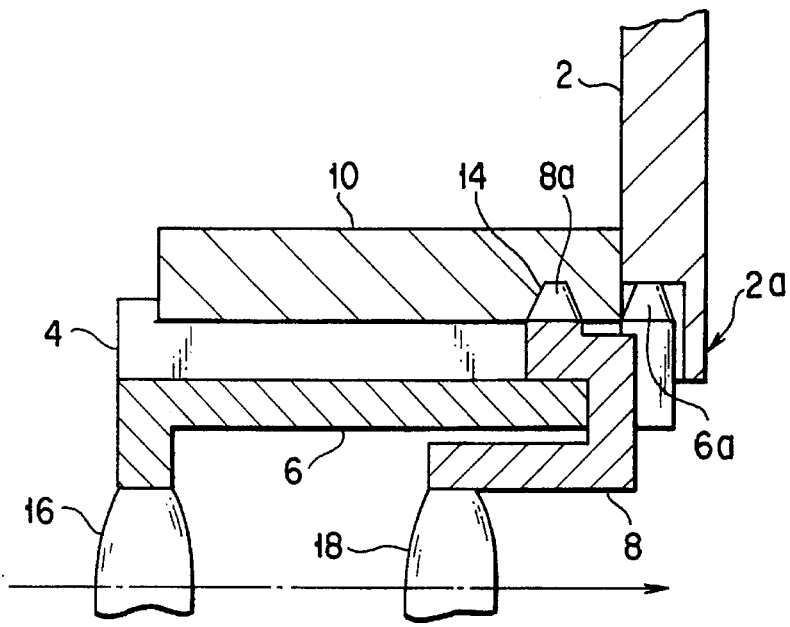
F I G. 3A
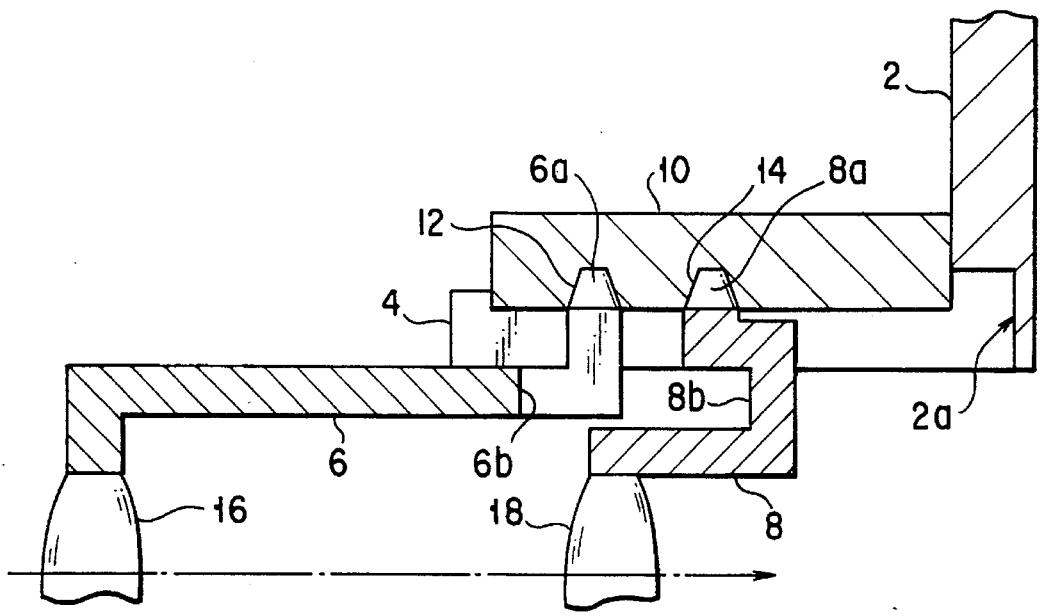
F I G. 3B

LENS BARREL

BACKGROUND OF THE INVENTION

1. Field of the Invention

The present invention relates to a lens barrel which is driven and controlled when the power of a camera is varied.

2. Description of the Related Art

Conventionally, a lens barrel as disclosed in Jpn. UM Appln. KOKAI Publication No. 1-59210 (hereinafter referred as the conventional lens barrel) is known.

The conventional lens barrel comprises a movable lens frame, an interlock pin provided thereon, and a cam ring having a cam groove with which the interlock pin is engaged. The movable lens frame is movable along the optical axis by moving the interlock pin along the cam groove in accordance with the rotation of the cam ring.

However, in the conventional lens barrel, since the cam groove is formed on the peripheral surface of the cam ring, the length along the optical axis of the cam ring must be as long as the length of a stroke of the movable lens frame along the optical axis plus a. Hence, the size of the camera body in the direction of the optical axis cannot be reduced due to the length of the cam ring.

SUMMARY OF THE INVENTION

The present invention has been made to overcome the above drawback of the conventional lens barrel, and has as its object to provide a lens barrel having a cam ring, the length in the optical direction of which can be reduced by simple means.

To achieve the above object, according to the present invention, when the cam ring is rotated in one direction so as to retract a first lens barrel along the optical axis, a first cam follower is moved backward from an opening portion. When the cam ring is rotated in the other direction, a second lens barrel abuts on the first lens mirror frame, thereby introducing the first cam follower into the opening portion again.

With the present invention, since the opening portion communicates with the rear end of the first cam groove, so that the first cam follower can be moved backward from the opening portion, the length along the optical axis of the cam ring can be reduced without reducing the amount of movement of the first lens barrel. As a result, the width of the lens barrel along the optical axis can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A is a cross-sectional view taken along the line C—C in FIGS. 1 and 2, showing a collapsed state of the lens barrel;

FIG. 3B is a cross-sectional view taken along the line C—C in FIGS. 1 and 2, showing an extended state of the lens barrel;

DETAILED DESCRIPTION OF THE PREFERRED EMBODIMENTS

Embodiments of the present invention will now be described with reference to the accompanying drawings. FIGS. 1 to 3A and 3B show a lens barrel according to a first embodiment of the present invention.

As shown in FIGS. 1 to 3A and 3B, the lens barrel comprises a plurality of main body ribs 4 formed integral with a camera main body 2 and protruding therefrom along the optical axis, first and second lens barrels 6 and 8 formed between a pair of the main body ribs 4 and movable therebetween along the optical axis, and a cam ring 10 mounted on the periphery of the main body ribs 4, the first and the second lens barrels 6 and 8 and rotatable with respect to the camera main body 2 around the optical axis.

Figure 1:
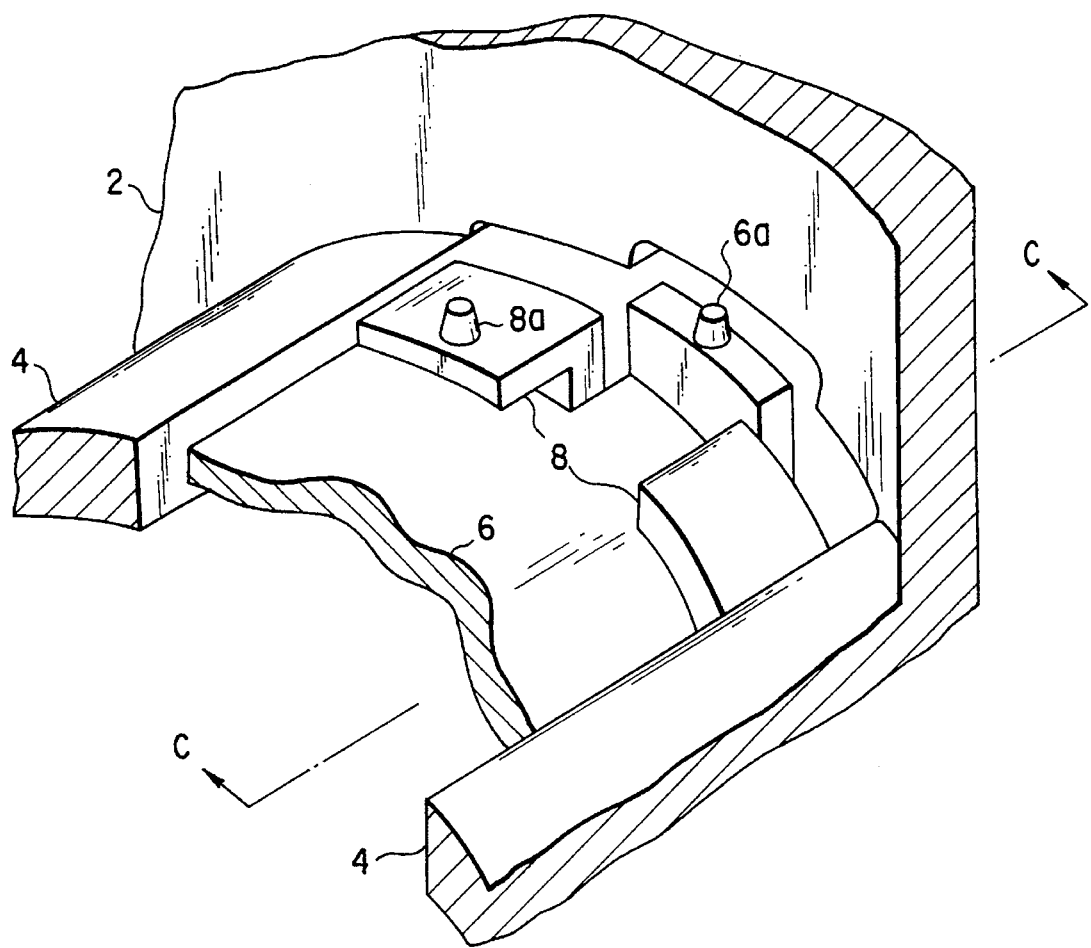
FIG. 1 is an enlarged perspective view showing the main part of a lens barrel according to a first embodiment of the present invention.

In FIG. 1, the cam ring 10 is omitted for convenience of explanation.

The cam ring 10 has first and second cam grooves 12 and 14, which can be respectively engaged with first and second cam followers 6a and 8a of the first and the second lens barrels 6 and 8.

Figure 2:
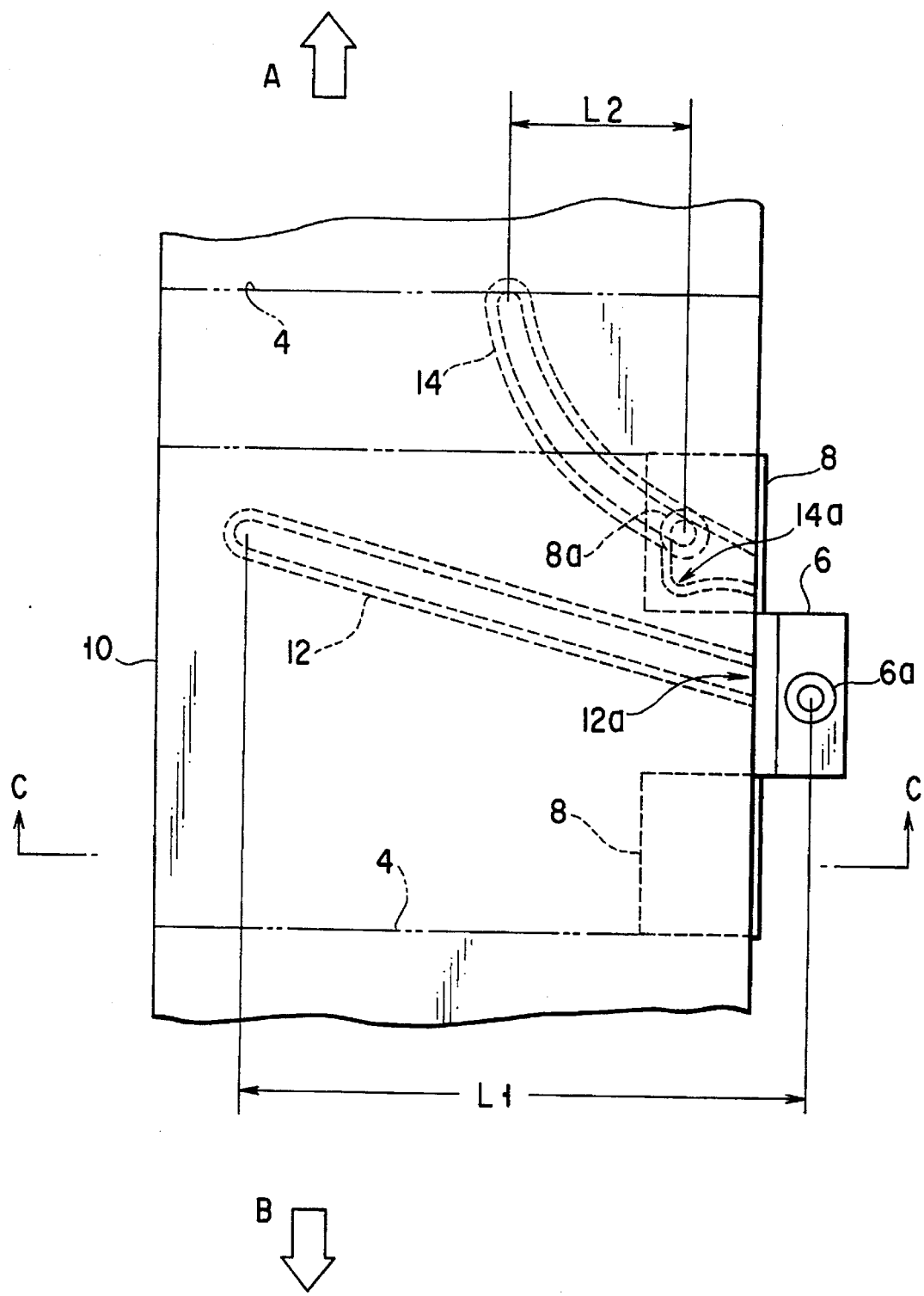
FIG. 2 is an enlarged side view showing the main part of the lens barrel shown in FIG. 1.

With this structure, when the cam ring 10 is rotated with respect to the main body 2 in a direction A or B shown in FIG. 2, the first and second cam followers 6a and 8a are moved forward or backward in the first and second cam grooves 12 and 14. Thus, the first and second lens barrels 6 and 8 are moved in the direction of the optical axis along the pair of the main body ribs 4, which are fixed to the camera main body 2 and protrude therefrom parallel with the optical axis.

More specifically, when the cam ring 10 is rotated in the direction A or B shown in FIG. 2, the first and second cam followers 6a and 8a formed on the first and second lens barrels 6 and 8 are moved forward or backward in the first and second cam grooves 12 and 14, respectively. Since the direction of movement of the first and second lens barrels 6 and 8 are limited to the direction of the optical axis by the pair of main body ribs 4, the forward or backward movement of the first and second cam followers 6a and 8a along the first and second cam grooves 12 and 14 owing to the rotation of the cam ring 10 causes forward or backward movement of the first and second lens barrels 6 and 8 along the optical axis.

First and second lenses 16 and 18 (FIGS. 3A and 3B), which constitute a photographing optical system, are respectively mounted on the first and second lens barrels 6 and 8.

In the lens barrel of the embodiment having the above structure, the first cam groove 12 has an opening 12a which faces the camera main body 2 (FIGS. 3A and 3B), as shown in FIG. 2. The first cam follower 6a of the first lens barrel 6 is positioned nearer to the camera main body 2 than the second cam follower 8a of the second lens barrel 8.

Hence, when the cam ring 10 is rotated in the direction A so that first and second lens barrels 6 and 8 are positioned as shown in FIGS. 2 and 3A (in a collapsed state), the first cam follower 6a of the first lens barrel 6 is introduced into the camera main body 2 (FIG. 3A) through the opening 12a of the first cam groove 12 (and is positioned outside the first cam groove 12). At this time, the second cam follower 8a is positioned in the second cam groove 14.

In this state, a photographing drive system (not shown) incorporated in the camera is not driven and cannot perform a photographing operation.

To perform a photographing operation, a photographing start and stop switch (not shown) of the camera is operated, thereby driving the photographing drive system. As a result, the cam ring 10 is rotated in the direction B shown in FIG. 2. This rotational movement is transferred to the second cam follower 8a through the second cam groove 14, so that the second lens barrel 8 is moved along the pair of main body ribs 4 parallel with the optical axis.

When the second lens barrel 8 is moved, a second contact surface 8b (FIG. 3B) thereof is brought into contact with a first contact surface 6b (FIG. 3B) of the first lens barrel 6. Thus, the first lens mirror frame 6 is pressed forward along the optical axis. As a result, the first cam follower 6a of the first lens barrel 6 is inserted into a predetermined position in the first cam groove 12 through the opening 12a. At this time, the camera is set in the photographing start state, in which a photographing operation can be performed at a desired power by rotating the cam ring 10 in a predetermined direction.

For example, FIG. 3B shows an extended state in which the cam ring 10 is further rotated in the direction B shown in FIG. 2, so that the first and second lens barrels 6 and 8 are at the farthest point possible from the camera main body 2, i.e., in a lens extension end position.

In both the collapsed state and the extended state, the amount of movement of the first and second cam followers 6a and 8a in the direction of the optical axis is respectively limited to L1 and L2 (L1>L2). In other words, the amount of movement of the lens mirror frame 6 is set greater than that of the lens barrel 8.

For this reason, as the cam ring 10 is rotated in the direction B shown in FIG. 2, so that there is a change from the collapsed state to the extended state, the first lens barrel 6 is removed from the second lens barrel 8 along the optical axis. In the extended state, the first and second lens barrels 6 and 8 are maintained in the positional relationship shown in FIG. 3B.

In this state, when the photographing drive system is stopped by operating the photographing start/stop switch, the cam ring 10 is rotated in the direction A shown in FIG. 2. This rotational movement is transferred to the first and second cam followers 6a and 8a through the first and second cam grooves 12 and 14, thereby moving the first and second lens barrels 6 and 8 along the pair of main body ribs 4 parallel with the optical axis.

when the first and second lens barrels 6 and 8 are moved to the collapsed position, the first cam follower 6a of the first lens barrel 6 is drawn out of the first cam groove 12 through the opening 12a and introduced into the camera main body 2 (FIG. 3A).

The second cam follower 8a of the second lens barrel 8 is engaged with a recess 14a formed in the second cam groove 14 so as to stop the movement of the second lens barrel 8. In this engaged state, the cam ring 10 cannot be further rotated in the direction A shown in FIG. 2.

Thus, the first and second lens barrels 6 and 8 are stably fixed and maintained in the collapsed state.

In this embodiment, the camera main body 2 has a thin portion 2a (FIGS. 3A and 3B) which faces the first cam follower 6a of the first lens barrel 6 in the collapsed state. With this structure, the position of the first cam follower 6a in the collapsed state is defined inside the camera main body 2 (FIGS. 3A and 3B), on the outside (in the direction of the optical axis) of the cam ring 10. Therefore, the length of the cam ring 10 in the direction of the optical axis is reduced without reducing the amount (L1) of movement of the first lens barrel 6. As a result, the size of the camera in the direction of the optical axis can be reduced without reducing the strength of the camera main body 2, while maintaining the range of variable power of the camera.

A lens barrel according to a second embodiment of the present invention will now be described with reference to FIGS. 4A and 4B. The elements of the second embodiment, which are the same as those of the first embodiment, are identified with the same reference numerals as in the first embodiment and the description thereof is omitted.

Figure 4A:
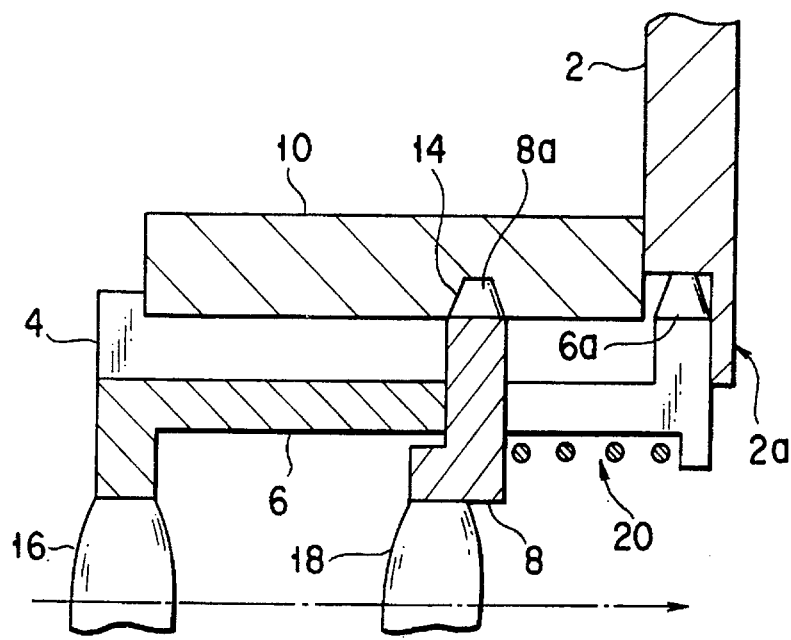
FIG. 4A is a cross-sectional view showing main part of the lens barrel in a retracted state, according to a second embodiment of the present invention.
Figure 4B:
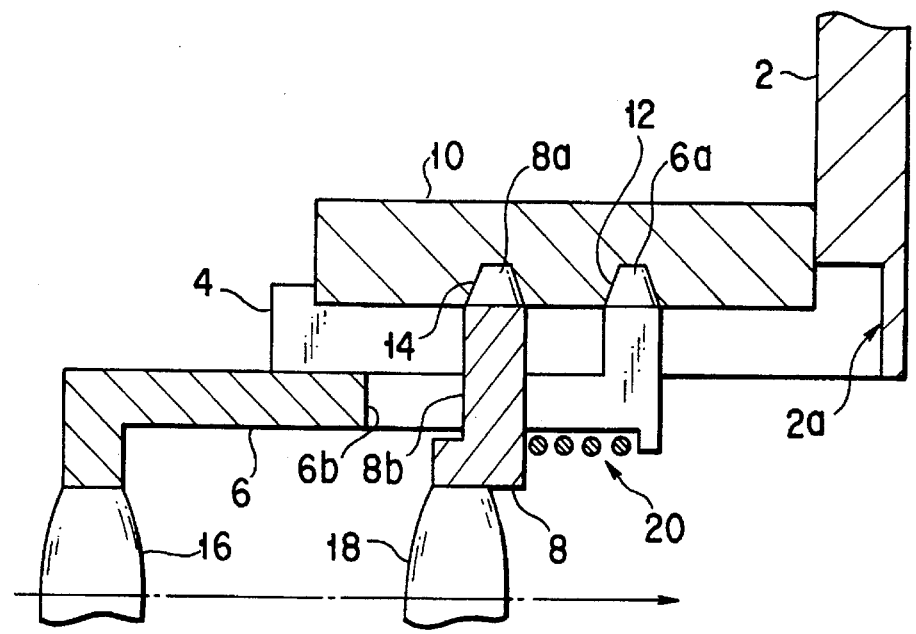
FIG. 4B is a cross-sectional view showing the main part of the lens barrel in an extended state, according to the second embodiment of the present invention.

As shown in FIGS. 4A and 4B, the lens barrel of the second embodiment comprises a coil spring 20 interposed between the first and second lens barrels 6 and 8. The first and second lens barrels 6 and 8 are biased by means of the coil spring 20 in the direction in which they are separated from each other.

As in the first embodiment, the amount of movement of the lens barrel 6 is set greater than that of the lens barrel 8 (L1>L2) (FIG. 2).

However, in the lens barrel of the second embodiment, since the first and second lens barrels 6 and 8 are kept away from each other by the biasing force of the coil spring 20, even if the first lens barrel 6 is moved to the front-most position by the rotation of the cam ring 10 in a photographing state, the first cam follower 6a of the first lens barrel 6 does not move to the front of the second cam follower 8a of the second lens barrel 8 (FIG. 4B).

Since the first lens barrel 6 is always biased backward, i.e., toward the portion 2a of the camera main body 2, along the optical axis, the first cam follower 6a projects through the opening 12a of the first cam groove 12 in the retracted state (FIG. 4A).

In addition, the second lens barrel 8 restricts the backward movement of the first lens barrel 6 to a certain degree. Therefore, when the cam ring 10 is rotated in the photographing direction (the direction B) again, the first contact surface 6b of the first lens barrel 6 is pressed forward along the optical axis by the second contact surface 8b of the second lens barrel 8. As a result, the first cam follower 6a is returned to the first cam groove 12.

In this embodiment, the coil spring 20 can be replaced by a conical coil spring, for example. In this case, the distance between the first and second lens barrels 6 and 8 can be very small in the collapsed state.

Since the advantage of this embodiment is the same as that of the first embodiment, the description thereof is not repeated.

The present invention is not limited to the above embodiments, but can be variously modified within the spirit and scope of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A lens barrel having a photographing optical system, comprising:

a cam ring rotatable around an optical axis;

a first cam groove formed in the cam ring;

a first lens supporting frame which is moved backward in the direction of the optical axis by rotating the cam ring in one direction and forward in the direction of the optical axis by rotating the cam ring in the other direction, the first lens supporting frame having a first cam follower to be engaged with the first cam groove;

a second cam groove formed in the cam ring, a back end of the second cam groove ranging to a back end surface of the cam ring;

a second lens supporting frame which is moved backward in the direction of the optical axis by rotating the cam ring in one direction and forward in the direction of the optical axis by rotating the cam ring in the other direction, the second lens supporting frame having a second cam follower to be engaged with the second cam groove, the second cam follower being disengaged from the second cam groove and retracted behind the back end surface of the cam ring when the cam ring is rotated in the one direction to a limit of a rotatable range of the cam ring; and a driving section which is provided in the first lens supporting frame and brought into contact with a back end surface of the second lens supporting frame so as to restrict backward movement of the second lens supporting frame in the direction of the optical axis, when the cam ring is rotated in the one direction to the limit of the rotatable range, and which urges forward the back end surface of the second lens supporting frame so as to insert the second cam follower into the second cam groove, when the cam ring positioned at the limit of the rotatable range is rotated in the other direction.

2. The lens barrel having a photographing optical system according to claim 1, wherein the photographing optical system is restricted in a photographing unable state, when the cam ring is rotated in the one direction to the limit of the rotatable range.

3. The lens barrel having a photographing optical system according to claim 1, further comprising biasing means for biasing the second lens supporting frame backward in the direction of the optical axis.

4. The lens barrel having a photographing optical system according to claim 3, wherein the biasing means is mounted between the first and second lens supporting frames.

5. The lens barrel having a photographing optical system according to claim 1, wherein portions of the first and second cam grooves near the limit of the rotatable range in the one direction make substantially the same angle to the optical axis.

6. The lens barrel having a photographing optical system according to claim 1, wherein the second lens supporting frame is moved forward in the direction of the optical axis, ahead of the first lens supporting frame, when the cam ring positioned at the limit of the rotatable range in the one direction is rotated in the other direction.

7. A lens barrel having a photographing optical system, comprising:

a cam ring rotatable around an optical axis;

a cam groove formed in the cam ring, a back end of the cam groove ranging to a back end surface of the cam ring;

a lens supporting frame which is moved backward in the direction of the optical axis by rotating the cam ring in one direction and forward in the direction of the optical axis by rotating the cam ring in the other direction, the lens supporting frame having a cam follower to be engaged with the cam groove, the cam follower being disengaged from the cam groove and retracted behind the back end surface of the cam ring when the cam ring is rotated in the one direction to a limit of a rotatable range of the cam ring; and drive means which is brought into contact with a back end surface of the lens supporting frame so as to restrict backward movement of the lens supporting frame in the direction of the optical axis, when the cam ring is rotated in the one direction to the limit of the rotatable range, and which urges forward the back end surface of the lens supporting frame so as to insert the cam follower into the cam groove, when the cam ring positioned at the limit of the rotatable range in the one direction is rotated in the other direction.

8. The lens barrel having a photographing optical system according to claim 7, further comprising:

another lens supporting frame which is moved backward in the direction of the optical axis by rotating the cam ring in the one direction and forward in the direction of the optical axis by rotating the cam ring in the other direction, wherein the drive means is provided in said another lens supporting frame.

9. The lens barrel having a photographing optical system according to claim 8, further comprising biasing means mounted between the supporting frame and said another lens supporting frame.

10. The lens barrel having a photographing optical system according to claim 7, wherein the photographing optical system is restricted in a photographing unable state, when the cam ring is rotated in the one direction to the limit of the rotatable range.

11. A lens barrel having a photographing optical system, comprising:

a cam ring rotatable around an optical axis and having first and second cam grooves;

first and second lens supporting frame moved forward and backward in the direction of the optical axis by rotating the cam ring, the first and second lens supporting frames having first and second cam followers to be engaged with the first and second cam grooves, respectively; and an opening portion ranging from an end of the second cam groove to a back end surface of the cam ring, so that the second cam follower is moved behind the back end surface of the cam ring, when the second lens supporting frame is moved backward in the direction of the optical axis to a back limit by rotating the cam ring in the one direction, wherein when the first lens supporting frame is positioned at the back limit in the direction of the optical axis by rotation of the cam ring in the one direction, it is brought into contact with a back end surface of the second lens supporting frame, and when the first lens supporting frame is moved forward in the direction of the optical axis by rotation of the cam ring in the other direction, it moves the back end surface of the second lens supporting frame, forward in the direction of the optical axis, so that the second cam follower is inserted into the second cam groove.

12. The lens barrel having a photographing optical system according to claim 11, wherein the photographing optical system is restricted in a photographing unable state, when the first and second lens supporting frames are positioned at the back limit in the direction of the optical axis.

13. The lens barrel having a photographing optical system according to claim 11, further comprising biasing means for biasing the first lens supporting frame in the direction of the optical axis.

14. A lens barrel having a photographing optical system, comprising:

a cam ring rotatable around an optical axis;

a first cam groove formed in the cam ring;

a first lens supporting frame which is moved backward in the direction of the optical axis by rotating the cam ring in one direction and forward in the direction of the optical axis by rotating the cam ring in the other direction, the first lens supporting frame having a first cam follower to be engaged with the first cam groove;

a second cam groove formed in the cam ring;

a second lens supporting frame which is moved backward in the direction of the optical axis by rotating the cam ring in one direction and forward in the direction of the optical axis by rotating the cam ring in the other direction, the second lens supporting frame having a second cam follower to be engaged with the second cam groove;

an opening portion ranging from an end of the second cam groove to a back end surface of the cam ring, so that the second cam follower is moved behind the back end surface of the cam ring, when the cam ring is rotated in the one direction to a limit of a rotatable range of the cam ring; and a driving section which is provided in the first lens supporting frame and brought into contact with a back end surface of the second lens supporting frame so as to restrict backward movement of the second lens supporting frame in the direction of the optical axis, when the cam ring is rotated in the one direction to the limit of the rotatable range, and which urges forward the back end surface of the second lens supporting frame so as to insert the second cam follower into the second cam groove through the opening portion, when the cam ring positioned at the limit of the rotatable range in the one direction is rotated in the other direction.

15. A lens barrel having a photographing optical system, comprising:

a cam ring rotatable around an optical axis;

a cam groove formed in the cam ring;

a lens supporting frame which is moved backward in the direction of the optical axis by rotating the cam ring in one direction and forward in the direction of the optical axis by rotating the cam ring in the other direction, the lens supporting frame having a cam follower to be engaged with the cam groove;

an opening portion ranging from an end of the second cam groove to a back end surface of the cam ring, so that the cam follower is moved behind the back end surface of the cam ring, when the cam ring is rotated in a direction to a limit of a rotatable range of the cam ring; and drive means which is brought into contact with a back end surface of the lens supporting frame so as to restrict backward movement of the lens supporting frame in the direction of the optical axis, when the cam ring is rotated in the one direction to the limit of the rotatable range, and which urges forward the back end surface of the lens supporting frame so as to insert the cam follower into the cam groove through the opening, when the cam ring positioned at the limit of the rotatable range in the one direction is rotated in the other direction.

16. A lens barrel having a photographing optical system, comprising:

a first movable frame movable in the lens barrel in the direction of its optical axis;

a second movable frame movable in the lens barrel in the direction of its optical axis; and guide means having first and second guide sections, respectively engaged with the first and second movable frames, for moving the first and second movable frames in the direction of the optical axis, wherein:

the first guide section has a normal photographing region used in a normal photographing state and a non-photographing region used in a non-photographing state; and when the first movable frame is located in the normal photographing region, the second guide section and the second movable frame are kept in an engaged state by the guide means, and when the first movable frame is located in the non-photographing region, the second movable frame is disengaged from the second guide section, behind a terminal end of the second guide section, by the guide means.

17. The lens barrel having a photographing optical system according to claim 16, wherein the guide means is a cam member.

18. The lens barrel having a photographing optical system according to claim 16, wherein the photographing optical system is supported by the first and second movable frames.

19. The lens barrel having a photographing optical system according to claim 16, further comprising biasing means for separating the first and second movable frames from each other in the direction of the optical axis and for urging the second movable frame to be released from its engagement with the second guide section, behind said terminal end of the second guide section, when the first movable frame is moved to the non-photographing region.

20. The lens barrel having a photographing optical system according to claim 16, wherein the non-photographing state is a collapsed state of the lens barrel.

21. A lens barrel having a photographing optical system, comprising:

a movable frame movable in the lens barrel in the direction of its optical axis; and guide means, engaged with the movable frame, for moving the movable frame in the direction of said optical axis, the guide means being maintained in an engaged state, in which the guide means is engaged with the movable frame, in a normal photographing state and disengaged from the movable frame, behind a terminal end of the movable frame, in a non-photographing state.

22. The lens barrel having a photographing optical system according to claim 21, wherein the guide means is a cam member.

23. The lens barrel having a photographing optical system according to claim 21, wherein the photographing optical system is supported by the movable frame.

24. The lens barrel having a photographing optical system according to claim 21, wherein the non-photographing state is a collapsed state of the lens barrel.

25. A lens barrel having a photographing optical system, comprising:

a cam ring rotatable around an optical axis;

a cam groove formed in the cam ring, a back end of the cam groove ranging to a back end surface of the cam ring; and a lens supporting frame moved backward in the direction of the optical axis by rotating the cam ring in one direction and forward in the direction of the optical axis by rotating the cam ring in the other direction, said lens supporting frame having a cam follower to be engaged with the cam groove, said cam follower being disengaged from the cam groove and retreated behind the back end surface of the cam groove when the cam ring is rotated to a one-directional rotation side end portion of a rotatable range.

26. A lens barrel having a photographing optical system, comprising:

a cam ring rotatable around an optical axis;

a cam groove formed in the cam ring, a back end of the cam groove ranging to a back end surface of the cam ring;

a lens supporting frame moved backward in the direction of the optical axis by rotating the cam ring in one direction and forward in the direction of the optical axis by rotating the cam ring in the other direction, said lens supporting frame having a cam follower to be engaged with the cam groove, said cam follower being disengaged from the cam groove and retreated behind the back end surface of the cam groove when the cam ring is rotated to a one-directional rotation side end portion of a rotatable range; and moving means for engaging the cam follower with the cam groove again by the rotation of the cam ring in the other direction when the cam follower is retreated behind the back end surface of the cam groove.

27. A lens barrel having a photographing optical system, comprising:

a cam ring rotatable around an optical axis;

a first cam groove formed in the cam ring;

a first lens supporting frame moved backward in the direction of the optical axis by rotating the cam ring in one direction and forward in the direction of the optical axis by rotating the cam ring in the other direction, said first lens supporting frame having a first cam follower to be engaged with the cam groove;

a second cam groove formed in the cam ring, a back end of the second cam groove ranging to a back end surface of the cam ring;

a second lens supporting frame moved backward in the direction of the optical axis by rotating the cam ring in one direction and forward in the direction of the optical axis by rotating the cam ring in the other direction, said second lens supporting frame having a second cam follower to be engaged with the cam groove, said second cam follower being disengaged from the cam groove and retreated behind the back end surface of the cam groove when the cam ring is rotated to a one-directional rotation side end portion of a rotatable range; and moving means for engaging the second cam follower with the second cam groove again by the rotation of the cam ring in the other direction when the second cam follower is retreated behind the back end surface of the cam groove, said moving means including the first cam groove formed in the cam ring and the first lens supporting frame.

* * * * *